(12) United States Patent
Cho et al.

(10) Patent No.: US 9,548,491 B2
(45) Date of Patent: Jan. 17, 2017

(54) POSITIVE ELECTRODE ACTIVE MATERIAL FOR RECHARGEABLE LITHIUM BATTERY, MANUFACTURING METHOD OF SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Chae-Woong Cho, Yongin-si (KR); Seung-Hun Han, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 64 days.

(21) Appl. No.: 14/597,998

(22) Filed: Jan. 15, 2015

(65) Prior Publication Data
US 2015/0228972 A1    Aug. 13, 2015

(30) Foreign Application Priority Data

Feb. 7, 2014  (KR) .................. 10-2014-0014246

(51) Int. Cl.
| | | |
|---|---|---|
| *H01M 4/36* | (2006.01) | |
| *H01M 4/58* | (2010.01) | |
| *H01M 4/04* | (2006.01) | |
| *H01M 4/525* | (2010.01) | |
| *H01M 4/52* | (2010.01) | |
| *H01M 4/131* | (2010.01) | |
| *H01M 4/136* | (2010.01) | |
| *H01M 4/1397* | (2010.01) | |
| *H01M 4/62* | (2006.01) | |

(52) U.S. Cl.
CPC .......... *H01M 4/366* (2013.01); *H01M 4/0421* (2013.01); *H01M 4/131* (2013.01); *H01M 4/136* (2013.01); *H01M 4/1397* (2013.01); *H01M 4/52* (2013.01); *H01M 4/525* (2013.01); *H01M 4/5825* (2013.01); *H01M 4/625* (2013.01); *Y02E 60/122* (2013.01); *Y02P 70/54* (2015.11)

(58) Field of Classification Search
CPC .... H01M 4/366; H01M 4/5828; H01M 4/131; H01M 4/52; H01M 4/525; H01M 4/5825; Y02E 60/122
See application file for complete search history.

(56) References Cited

U.S. PATENT DOCUMENTS 8,597,835 B2    12/2013  Kawasaki et al.

FOREIGN PATENT DOCUMENTS

| CN | 101527353 | * | 9/2009 |
|---|---|---|---|
| JP | 2007-035295 A | | 2/2007 |
| JP | 2011-204638 A | | 10/2011 |
| KR | 10-2012-0093874 A | | 8/2012 |
| KR | 10-2013-0085915 A | | 7/2013 |

OTHER PUBLICATIONS

Wu et al. "Carbon-Nanotube-Decorated Nano-LiFePO4 @C Cathode Material with Superior High-Rate and Low-Temperature Performances for Lithium-Ion Batteries", Advanced Energy Materials (2013), 3(9), pp. 1155-1160.*
Feng. "The preparation and electrochemical performances of LiFePO4-multiwalled nanotubes composite cathode materials for lithium ion batteries", Materials Chemistry and Physics 121 (2010), pp. 302-307.*
Mohamed et al. "Preparation and characterisation of LiFePO4/CNT material for Li-ion batteries".International Journal of Electrochemistry (2011), Article ID 283491, 5 pages.*
Nguyen et al. "Electrochemical characterization of LiFePO4/poly(sodium 4-styrenesulfonate)-multiwalled carbon nanotube composite cathode material for lithium ion batteries" Journal of Alloys and Compounds (2013), 569, 29-34.*
Xu et al. "Electrochemical performance of LiFePO4 cathode material coated with multi-wall carbon nanotubes", Materials Chemistry and Physics (2009), 118(1), 9-11.*

* cited by examiner

*Primary Examiner* — Laura Weiner
(74) *Attorney, Agent, or Firm* — Knobbe Martens Olson & Bear LLP

(57) ABSTRACT

Disclosed are a positive active material for a rechargeable lithium battery including a core including a lithium nickel-based oxide, a lithium iron phosphate-based compound, or a combination thereof; and carbon nanotube grown on the surface of the core, and a rechargeable lithium battery including the same.

4 Claims, 6 Drawing Sheets

POSITIVE ELECTRODE ACTIVE MATERIAL FOR RECHARGEABLE LITHIUM BATTERY, MANUFACTURING METHOD OF SAME, AND RECHARGEABLE LITHIUM BATTERY INCLUDING SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0014246 filed in the Korean Intellectual Property Office on Feb. 7, 2014, the disclosure of which is incorporated herein by reference in its entirety.

BACKGROUND

Field

This disclosure relates to a positive active material for a rechargeable lithium battery, a manufacturing method thereof, and a rechargeable lithium battery including the same.

Description of the Related Technology

A rechargeable lithium battery includes positive and negative electrodes including a material that can reversibly intercalate/deintercalate lithium ions as positive and negative active materials and an organic electrolyte solution or a polymer electrolyte solution charged between the positive and negative electrodes. The positive and negative electrodes intercalate and deintercalate lithium ions and produce electrical energy through oxidation and reduction reactions.

A positive active material for the rechargeable lithium battery may include an oxide consisting of lithium and a transition metal and having a structure capable of intercalating lithium, for example, a lithium cobalt-based oxide, a lithium manganese-based oxide, a lithium nickel-based oxide, a lithium iron phosphate-based compound, and the like.

This type of positive active material has low electrical conductivity and is mostly mixed with a conductive agent to prepare electrode slurry but has a limit of improving the low electrical conductivity. In order to improve the low electrical conductivity, the positive active material may be coated with carbon on the surface. However, since the positive active material is typically prepared by coating a carbon raw material such as sucrose thereon and firing it, the positive active material has low crystallinity and still includes impurities and thus, may hardly secure satisfactory electrical conductivity.

SUMMARY

One embodiment provides a positive active material for a rechargeable lithium battery having improved electrical conductivity, initial capacity, impedance, rate capability, cycle-life characteristics, and the like. Another embodiment provides a method of preparing the same.

Still another embodiment provides a rechargeable lithium battery including the same.

One embodiment provides a positive active material for a rechargeable lithium battery including a core including a lithium nickel-based oxide, a lithium iron phosphate-based compound, or a combination thereof; and carbon nanotube grown on the surface of the core.

In some embodiments, the positive active material for a rechargeable lithium battery may have a shape where the grown carbon nanotube surrounds the core.

In some embodiments, the grown carbon nanotube may be included in an amount of about 0.1 parts by weight to about 3 parts by weight based on 100 parts by weight of the core.

In some embodiments, the grown carbon nanotube may have a length of about 1 µm to 10 µm.

In some embodiments, the grown carbon nanotube may have a thickness of about 20 nm to 50 nm.

In some embodiments, the core may have an average particle diameter of about 1 µm to about 25 µm.

In another embodiment, a method of preparing a positive active material for a rechargeable lithium battery includes preparing a core including a lithium nickel-based oxide, a lithium iron phosphate-based compound, or a combination thereof; and growing carbon nanotube on the surface of the core.

In some embodiments, the method of a positive active material for a rechargeable lithium battery may further include forming a catalyst on the surface of the core after preparing the core.

In some embodiments, the catalyst may be at least one metal selected from Ni, Co, Fe, Pt, Au, Al, Cr, Cu, Mg, Mn, Mo, Rh, Si, Ta, Ti, W, U, V, or Zr, a chloride, an oxide, or a nitride thereof.

In some embodiments, the process of forming the catalyst on the surface of the core may include wet-mixing the core; and at least one metal selected from Ni, Co, Fe, Pt Au, Al, Cr, Cu, Mg, Mn, Mo, Rh, Si, Ta, Ti, W, U, V, or Zr, a chloride, an oxide, or a nitride thereof.

In some embodiments, the process of growing carbon nanotube on the surface of the core may include supplying a vapor carbon-based material on the core.

In some embodiments, the vapor carbon-based material may be carbon monoxide, methane, ethane, ethylene, ethanol, acetylene, propane, propylene, butane, butadiene, pentane, pentene, cyclopentadiene, hexane, cyclohexane, benzene, toluene, or a combination thereof.

In some embodiments, the process of growing carbon nanotube on the surface of the core may be performed at about 600° C. to about 1000° C.

In some embodiments, the carbon nanotube may be grown in an amount of about 0.1 parts by weight to about 3 parts by weight based on 100 parts by weight of the core.

In yet another embodiment, a rechargeable lithium battery including a positive electrode including the positive active material; a negative electrode; and an electrolyte is provided.

Other embodiments are included in the following detailed description.

The positive active material for a rechargeable lithium battery according to one embodiment, and a rechargeable lithium battery including the same have improved electrical conductivity, initial capacity, impedance, rate capability, cycle-life characteristics, and the like.

DETAILED DESCRIPTION

Figure 1:
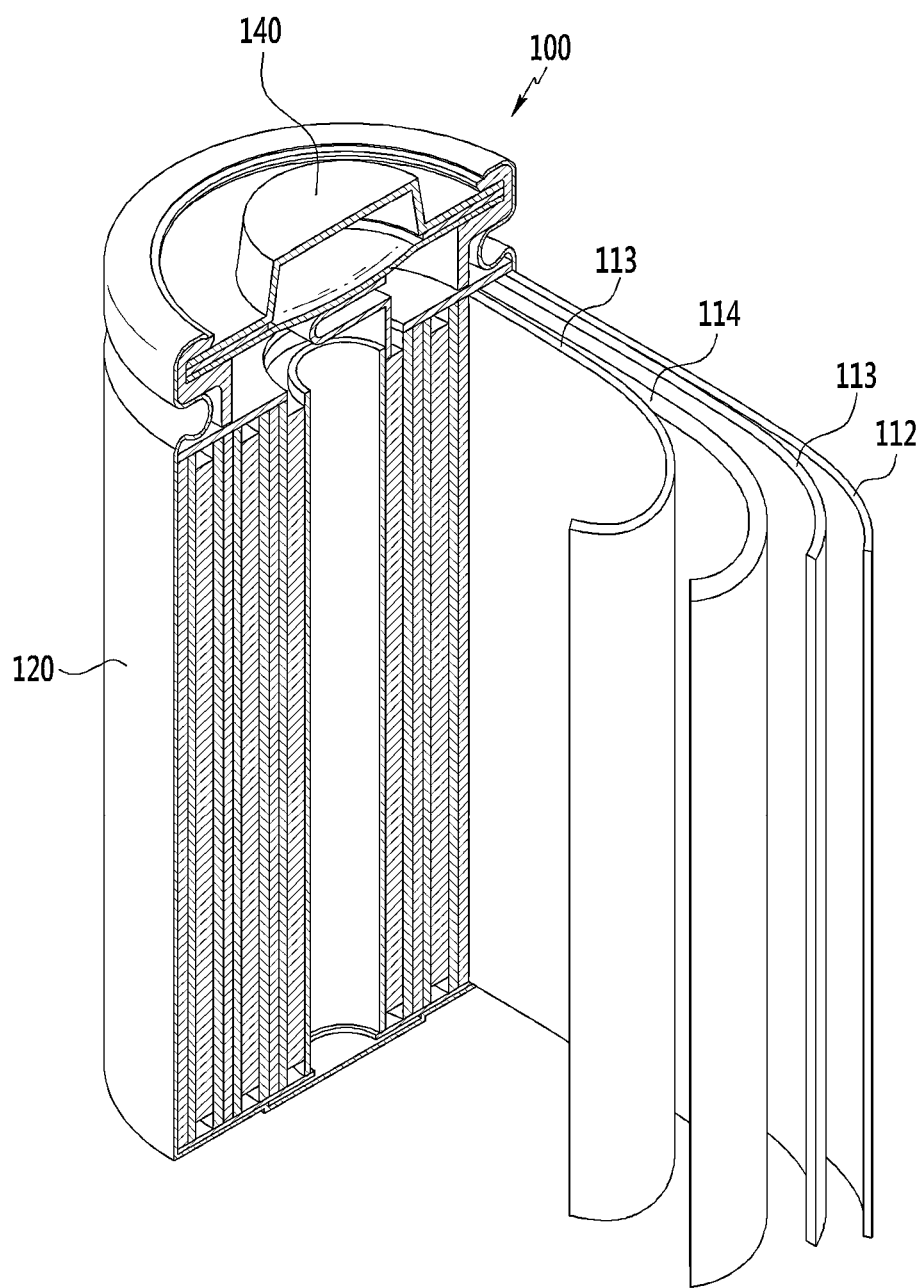
FIG. 1 is a schematic view showing the structure of a rechargeable lithium battery according to one embodiment.

Hereinafter, embodiments of the present disclosure are described in detail. However, these embodiments are exemplary, and this disclosure is not limited thereto.

In one embodiment, provided is a positive active material for a rechargeable lithium battery including a core including a lithium nickel-based oxide, a lithium iron phosphate-based compound, or a combination thereof; and carbon nanotube grown on the surface of the core.

In some embodiments, the carbon nanotube may grow on the surface of the core in a vertical direction.

In some embodiments, the positive active material for a rechargeable lithium battery may have a shape where the grown carbon nanotube surrounds the core.

This positive active material has higher electrical conductivity than a conventional positive active material obtained by physically coating a carbon raw material on an active material. Furthermore, this positive active material provides a positive electrode with higher electrical conductivity than the conventional positive electrode obtained by mixing a positive active material with a conductive material. Accordingly, this positive active material may improve rate capability, cycle-life characteristics, stability, and the like of a rechargeable lithium battery.

In general, when carbon nanotube and the like is physically coated on a positive active material, uniform and excellent properties may be difficult to secure due to low dispersity of the carbon nanotube, and the coating amount is limited. However, the positive active material according to one embodiment may secure uniform and excellent properties as well as high electrical conductivity.

The core may include any compound being capable of intercalating and deintercallating lithium generally used as a positive active material. Specifically, the core may include a lithium nickel-based oxide, a lithium iron phosphate-based compound, or a combination thereof.

In some embodiments, the lithium nickel-based oxide is a composite oxide of nickel and lithium but may further include a metal such as manganese, cobalt, aluminum, and the like other than the nickel. For example, the lithium nickel-based oxide may be lithium nickel manganese-based oxide, lithium nickel cobalt-based oxide, lithium nickel cobalt manganese-based oxide, lithium nickel cobalt aluminum-based oxide, and the like.

In some embodiments, the lithium iron phosphate-based compound may be represented by $LiFePO_4$. The lithium iron phosphate-based compound has low electrical conductivity, but when carbon nanotube grows on the surface thereof according to one embodiment, high electrical conductivity may be obtained. In other words, a positive active material according to one embodiment shows excellent electrical conductivity and may realize improved battery characteristics, since the carbon nanotube surrounds the lithium iron phosphate-based compound.

In some embodiments, the core may have an average particle diameter of about 1 µm to about 25 µm. The lithium nickel-based oxide may have an average particle diameter of about 10 µm to about 25 µm and the lithium iron phosphate-based compound may be a secondary particle structure formed of agglomerated primary particles, and herein, the secondary particle may have a particle diameter of several µm's. Herein, the carbon nanotube may effectively grow, and an active mass density of an electrode may be improved.

In some embodiments, the grown carbon nanotube may be included in an amount of about 0.1 parts by weight to about 3 parts by weight, specifically about 0.1 parts by weight to about 2.5 parts by weight, about 0.1 parts by weight to about 2 parts by weight, about 1 part by weight to about 3 parts by weight the core based on 100 parts by weight of the core. Herein, the positive active material has improved characteristics such as electrical conductivity, and the like.

In some embodiments, the grown carbon nanotube may have a length of about 1 µm to about 10 µm, specifically about 1 µm to about 9 µm, about 1 µm to about 8 µm, about 2 µm to about 10 µm, or about 3 µm to about 10 µm. Herein, the positive active material has excellent characteristics such as electrical conductivity, and the like.

In some embodiments, the grown carbon nanotube may have a thickness of about 20 nm to 50 nm. Herein, the positive active material has improved characteristics such as electrical conductivity, and the like.

In another embodiment, a method of preparing a positive active material for a rechargeable lithium battery includes preparing a core including a lithium nickel-based oxide, a lithium iron phosphate-based compound, or a combination thereof and growing carbon nanotube on the surface of the core.

In some embodiments, the method of a positive active material for a rechargeable lithium battery may further include forming a catalyst on the surface of the core after preparing the core.

In some embodiments, the catalyst may be any well-known catalyst for growing carbon nanotube in this art without limitation. For example, the catalyst may be at least one metal selected from Ni, Co, Fe, Pt, Au, Al, Cr, Cu, Mg, Mn, Mo, Rh, Si, Ta, Ti, W, U, V, or Zr, a chloride, an oxide, or a nitride thereof.

In some embodiments, the process of forming the catalyst on the surface of the core may specifically include wet-mixing the core; and at least one metal selected from Ni, Co, Fe, Pt Au, Al, Cr, Cu, Mg, Mn, Mo, Rh, Si, Ta, Ti, W, U, V, or Zr, a chloride, an oxide, or a nitride thereof. For example, a dispersion of the core is mixed with another dispersion of the metal and the like, so that the metal and the like may be adsorbed on the surface of the core. In the dispersion, a solvent may be water, ethanol, or a combination thereof.

When a catalyst is formed on the surface of the core in this way, a heat treatment is performed at about 60° C. to about 1000° C. to grow carbon nanotube on the surface of the core. That is to say, the process of growing carbon nanotube on the surface of the core may be performed at about 600° C. to about 1000° C. Under this temperature condition, the carbon nanotube may efficiently grow.

Alternatively, the process of growing the carbon nanotube on the surface of the core may include supplying a vapor carbon-based material on the core.

That is to say, a source of the carbon-based material may be a vapor carbon-based material, and the vapor carbon-based material may be, for example carbon monoxide, methane, ethane, ethylene, ethanol, acetylene, propane, propylene, butane, butadiene, pentane, pentene, cyclopentadiene, hexane, cyclohexane, benzene, toluene, or a combination thereof.

In some embodiments, the process of growing the carbon nanotube on the surface of the core may be performed in a thermal vapor method, and specifically, the carbon nanotube grows when a carbon-based material source contacts on the surface of the core and is thermally decomposed.

In some embodiments, the carbon nanotube may be grown in an amount of about 0.1 parts by weight to about 3 parts by weight, specifically about 0.1 parts by weight to about 2.5 parts by weight, about 0.1 parts by weight to about 2 parts by weight, or about 1 part by weight to about 3 parts by weight based on 100 parts by weight of the core. Herein, the positive active material has improved characteristics such as electrical conductivity, and the like.

In yet another embodiment, a rechargeable lithium battery including a positive electrode including the positive active material for a rechargeable lithium battery; a negative electrode; and an electrolyte is provided.

FIG. 1 is a schematic view of a structure of rechargeable lithium battery according to one embodiment.

Referring to FIG. 1, the rechargeable lithium battery 100 according to one embodiment is a cylindrical battery that includes a negative electrode 112, a positive electrode 114, a separator 113 interposed between the negative electrode 112 and positive electrode 114, and an electrolyte (not shown) impregnating the negative electrode 112, the positive electrode 114, and separator 113, a battery case 120, and a sealing member 140 sealing the battery case 120. In some embodiments, the rechargeable lithium battery 100 is manufactured by sequentially stacking the negative electrode 112, separator 113, and positive electrode 114, and spiral-winding them and housing the wound resultant in the battery case 120.

In some embodiments, the positive electrode 114 includes a current collector and a positive active material layer formed on the current collector. The current collector may be Al, but is not limited thereto.

In some embodiments, the positive active material layer includes a positive active material, a binder, and optionally a conductive material.

In some embodiments, the positive active material is the same as described above.

In some embodiments, the binder may be, for example polyvinyl alcohol, carboxylmethyl cellulose, hydroxypropyl cellulose, diacetyl cellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

In some embodiments, the conductive material improves electrical conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative and the like.

In some embodiments, the negative electrode 112 includes a current collector and a negative active material layer formed on the current collector.

In some embodiments, the current collector may be a copper foil, a nickel foil, a stainless steel foil, a titanium foil, a nickel foam, a copper foam, a polymer substrate coated with a conductive metal, or a combination thereof.

In some embodiments, the negative active material layer includes a negative active material, a binder, and optionally a conductive material.

In some embodiments, the negative active material includes a material that reversibly intercalates/deintercalates lithium ions, a lithium metal, a lithium metal alloy, material being capable of doping and dedoping lithium, or a transition metal oxide.

In some embodiments, the material that reversibly intercalates/deintercalates lithium ions is a carbon material, and may be any generally-used carbon-based negative active material in a rechargeable lithium ion battery, and examples thereof may be crystalline carbon, amorphous carbon, or a combination thereof. Examples of the crystalline carbon may be a graphite such as a shapeless, sheet-shaped, flake, spherical shaped or fiber-shaped natural graphite or artificial graphite, and examples of the amorphous carbon may be soft carbon or hard carbon, a mesophase pitch carbonized product, fired cokes, and the like.

In some embodiments, the lithium metal alloy may include an alloy of lithium and a metal of Na, K, Rb, Cs, Fr, Be, Mg, Ca, Sr, Si, Sb, Pb, In, Zn, Ba, Ra, Ge, Al, or Sn.

In some embodiments, the material being capable of doping and dedoping lithium may be Si, $SiO_x$ ($0<x<2$), a Si—C composite, a Si-Q alloy (wherein Q is an alkali metal, an alkaline-earth metal, Group 13 to 16 elements, a transition metal, a rare earth element, or a combination thereof, and not Si), Sn, $SnO_2$, a Sn—C composite, Sn—R (wherein R is an alkali metal, an alkaline-earth metal, Group 13 to 16 elements, a transition metal, a rare earth element, or a combination thereof, and not Sn), and the like. Specific examples of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In some embodiments, the transition metal oxide may be vanadium oxide, lithium vanadium oxide, and the like.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as a polyphenylene derivative and the like; or a mixture thereof.

In some embodiments, the negative electrode and the positive electrode may be manufactured by a method including mixing an active material, a conductive material, and a binder into an active material composition and coating the composition on a current collector.

In some embodiments, the electrolyte includes a non-aqueous organic solvent and a lithium salt.

In some embodiments, the non-aqueous organic solvent serves as a medium for transmitting ions taking part in the electrochemical reaction of a battery.

In some embodiments, the non-aqueous organic solvent may be selected from a carbonate-based, ester-based, ether-based, ketone-based, alcohol-based, or aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent includes methyl acetate, ethyl acetate, n-propyl acetate, dimethyl acetate, methyl propionate, ethyl propionate, γ-butyrolactone, decanolide, valerolactone, mevalonolactone, caprolactone, and the like. In some embodiments, the ether-based solvent includes dibutyl ether, tetraglyme, diglyme, dimethoxyethane, 2-methyltetrahydrofuran, tetrahydrofuran, and the like, and the ketone-based solvent includes cyclohexanone, and the like. In addition, the alcohol-based solvent may be ethanol, isopropyl alcohol, and the like. The aprotic solvent may include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

In some embodiments, the non-aqueous organic solvent may be used singularly or in a mixture. When the organic solvent is used in a mixture, the mixture ratio may be controlled in accordance with a desirable battery performance.

In some embodiments, the carbonate-based solvent is prepared by mixing a cyclic carbonate and a linear carbonate. In some embodiments, the cyclic carbonate and the linear carbonate are mixed together in the volume ratio of about 1:1 to about 1:9. Within this range, performance of electrolyte may be improved.

In some embodiments, the non-aqueous organic solvent includes an aromatic hydrocarbon-based organic solvent as well as the carbonate based solvent. In some embodiments, the carbonate-based and the aromatic hydrocarbon-based solvents may be mixed together in a volume ratio ranging from about 1:1 to about 30:1.

In some embodiments, the aromatic hydrocarbon-based organic solvent may be an aromatic hydrocarbon-based compound represented by Chemical Formula A:

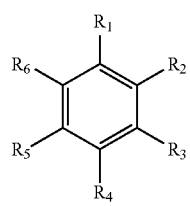

Chemical Formula A wherein in Chemical Formula A, $R_1$ to $R_6$ are independently hydrogen, a halogen, a C1 to C10 alkyl group, a C1 to C10 haloalkyl group, or a combination thereof.

Specific examples of the aromatic hydrocarbon based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the non-aqueous electrolyte may further include vinylene carbonate or an ethylene carbonate-based compound represented by Chemical Formula B in order to improve cycle-life of a battery:

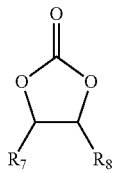

Chemical Formula B wherein in Chemical Formula B, $R_7$ and $R_8$ are independently, hydrogen, a halogen, a cyano group (CN), a nitro group ($NO_2$), or a C1 to C5 fluoroalkyl group, provided that at least one of the $R_7$ and $R_8$ is a halogen, a cyano group (CN), a nitro group ($NO_2$), or C1 to C5 fluoroalkyl group, provided that both $R_7$ and $R_8$ are not hydrogen.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. Such an additive used to improve cycle life may be adjusted within an appropriate range.

The lithium salt is dissolved in the non-aqueous solvent and supplies lithium ions in a rechargeable lithium battery, and basically operates the rechargeable lithium battery and improves lithium ion transfer between positive and negative electrodes. In some embodiments, the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein, x and y are natural numbers of 1 to 20, respectively), LiCl, LiI, $LiB(C_2O_4)_2$ (lithium bis(oxalato) borate), or a combination thereof. In some embodiments, the lithium salt may be used in a concentration of about 0.1M to about 2.0M. When the lithium salt is included at the above concentration range, an electrolyte may have excellent performance and lithium ion mobility due to optimal electrolyte conductivity and viscosity.

A separator may be present between the positive electrode and negative electrode depending on a kind of rechargeable lithium battery. Such a separator may include polyethylene, polypropylene, polyvinylidene fluoride or a multilayer thereof, for example a mixed multilayer such as a polyethylene/polypropylene double-layered separator, polyethylene/polypropylene/polyethylene triple-layered separator, polypropylene/polyethylene/polypropylene triple-layered separator, and the like.

Hereinafter, examples of the present disclosure and comparative examples are described. These examples, however, are not in any sense to be interpreted as limiting the scope of the embodiments.

Example 1

Preparation of Positive Active Material

First of all, LiFePO$_4$ particles having a secondary particle structure formed of agglomerated primary particles (the secondary particle having a size of several microns and the primary particle having about average particle diameter of 200 nm) were prepared. Subsequently, an iron oxide nanoparticle was adsorbed on the surface of the LiFePO$_4$, for example, a LiFePO$_4$ dispersion was mixed with an iron oxide nano particle dispersion dispersed in ethanol, and then the resultant mixture was dried and washed. The LiFePO$_4$ having the iron oxide nano particle on the surface was reduced by increasing a temperature up to 900° C. and maintaining the temperature for 4 hours, under a hydrogen atmosphere. Subsequently, the LiFePO$_4$ having the iron oxide nano particle on the surface was heat-treated at 900° C. for 10 minutes by supplying methane gas under a hydrogen/argon atmosphere to grow a carbon nanotube.

The grown carbon nanotube had a length of about 1 μm to 5 μm, and a thickness of about 50 nm to 100 nm. The amount of the grown carbon nanotube was 0.5 parts by weight based on 100 parts by weight of the active material.

Figure 2:
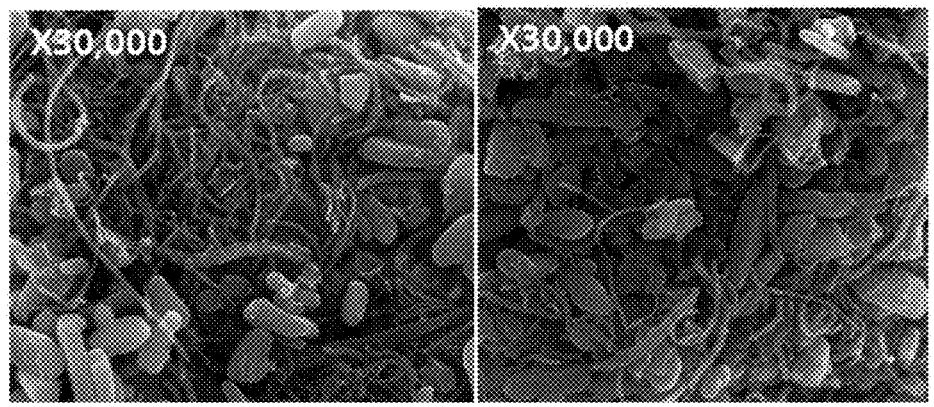
FIG. 2 is a scanning electron microscope photograph showing a positive active material according to Example 1.

FIG. 2 is a scanning electron microscope photograph showing the manufactured positive active material. FIG. 2 shows that the carbon nanotube grew on the surface of the LiFePO$_4$.

Manufacture of Positive Electrode

The positive active material along with a binder of PVdF, a conductive material of acetylene black in a weight ratio of 92:4:4 was put in a solvent of NMP and mixed together. The manufactured positive electrode composition slurry was coated on an aluminum current collector and then, dried and compressed, manufacturing a positive electrode.

Manufacture of Rechargeable Lithium Battery Cell

The positive electrode, a lithium metal as a counter electrode, a polypropylene separator, and an electrolyte solution by adding LiPF$_6$ in a concentration of 1.5 mol/L in a mixed solvent obtained by mixing ethylene carbonate (EC):diethyl carbonate (DEC):fluoro ethylene carbonate (FEC) in a volume ratio of 5:70:25 were used to manufacture a rechargeable lithium battery cell.

Comparative Example 1

LFP+CB

A rechargeable lithium battery cell was manufactured according to the same method as Example 1 except for using LiFePO$_4$ as a positive active material and carbon black as a conductive material to prepare positive electrode composition slurry.

Comparative Example 2

LFP+CNT

A rechargeable lithium battery cell was manufactured according to the same method as Example 1 except for using LiFePO$_4$ as a positive active material and carbon nanotube as a conductive material to prepare positive electrode composition slurry.

Comparative Example 3

A positive active material was prepared by mixing 99 wt % of LiFePO$_4$ and 1 wt % of carbon nanotube in a solvent of NMP and firing the mixture at 300° C. to coat carbon nanotube on the surface of the LiFePO$_4$. A rechargeable lithium battery cell was manufactured according to the same method Example 1 except for using the instant positive active material.

Evaluation Example 1

Coulomb Efficiency

Figure 3:
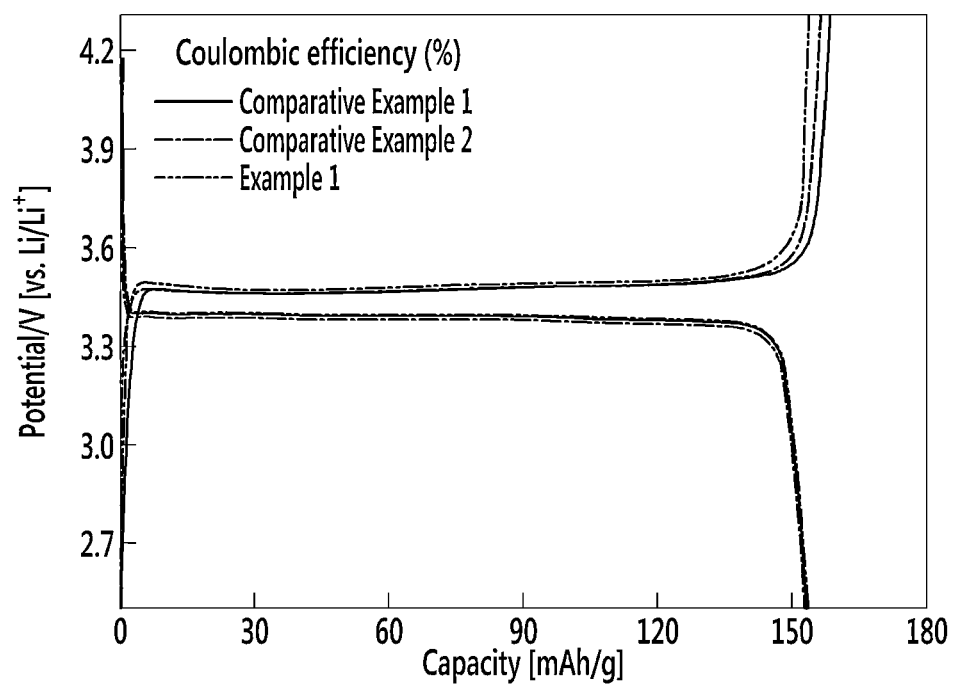
FIG. 3 is a graph showing coulomb efficiency of battery cells according to Example 1 and Comparative Examples 1 and 2.

Coulomb efficiency of the battery cells according to Example 1 and Comparative Examples 1 and 2 was evaluated, and the results are provided in FIG. 3. The coulomb efficiency of Example 1 was 99.3%, while that of Comparative Example 1 was 96.8%, and that of Comparative Example 2 was 98.2%. Accordingly, Example 1 showed much higher coulomb efficiency than Comparative Examples 1 and 2.

Evaluation Example 2

Cycle-Life Characteristics

Figure 4:
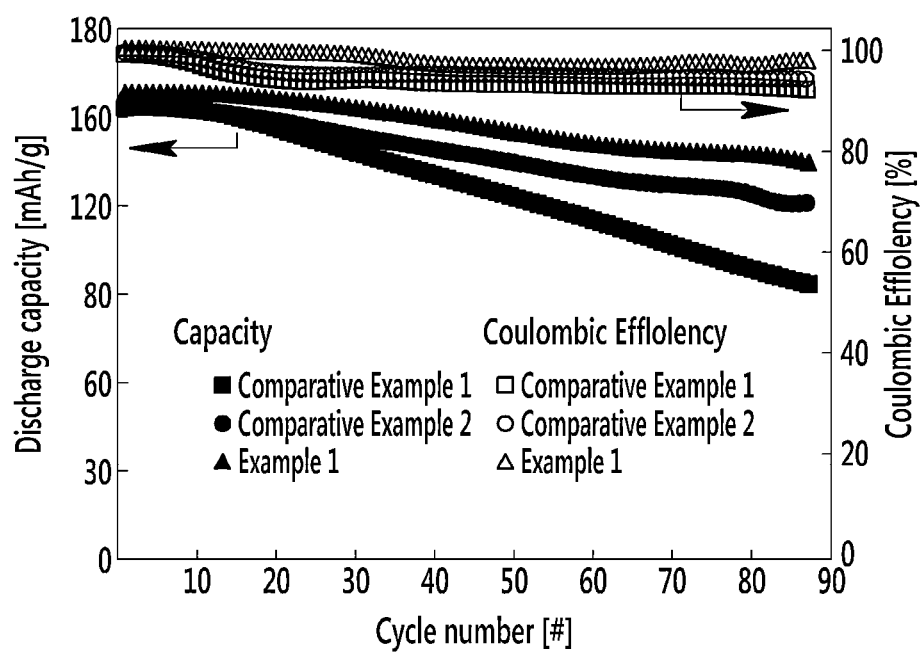
FIG. 4 is graph showing cycle-life characteristics of the battery cells according to Example 1 and Comparative Examples 1 and 2.

Cycle-life characteristics of the battery cells according to Example 1 and Comparative Examples 1 and 2 were evaluated, and the results are provided in FIG. 4. Referring to FIG. 4, Example 1 showed much excellent cycle-life characteristics compared with Comparative Examples 1 and 2.

Evaluation Example 3

Rate Capability

Figure 5:
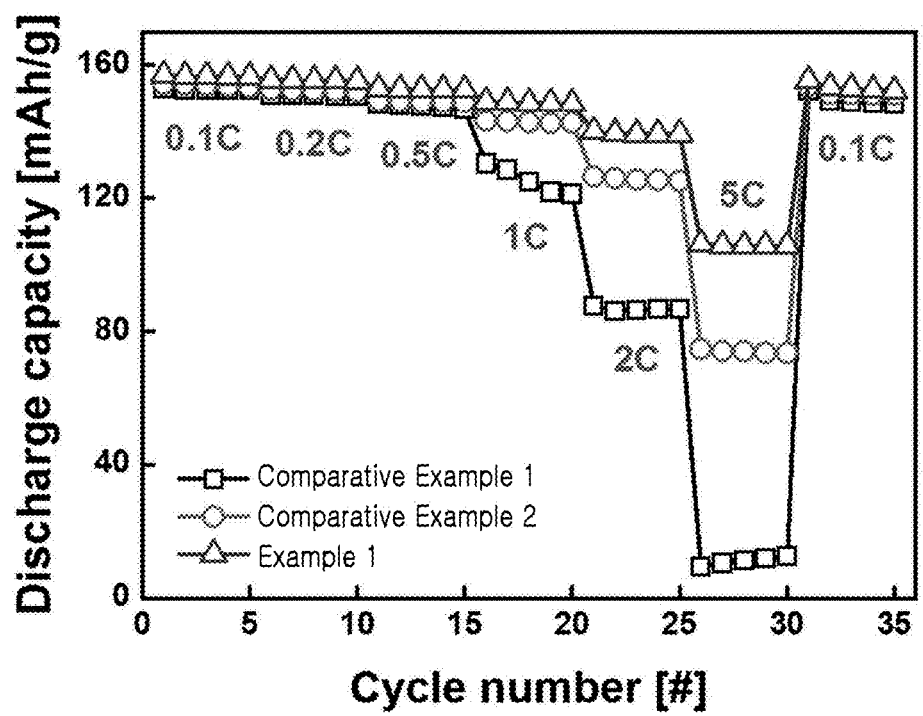
FIG. 5 is a graph showing rate capability of the battery cells according to Example 1 and Comparative Examples 1 and 2.

Rate capability of the battery cells according to Example 1, Comparative Examples 1 and 2 was evaluated, and the results are provided in FIG. 5. Referring to FIG. 5, Example 1 showed much excellent output characteristics at a high rate compared with Comparative Examples 1 and 2.

Evaluation Example 4

Cell Resistance

Figure 6:
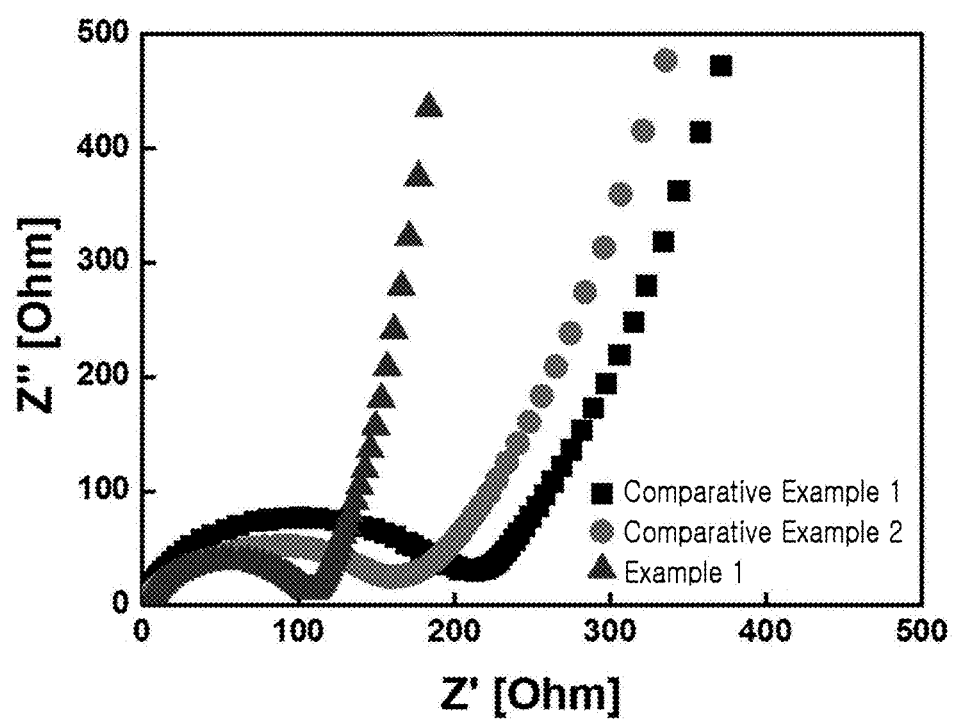
FIG. 6 is a graph showing resistance of the battery cells according to Example 1 and Comparative Examples 1 and 2.

Cell resistance characteristics of the battery cells according to Example 1 and Comparative Examples 1 and 2 were evaluated, and the results are provided in FIG. 6. Referring to FIG. 6, Example 1 showed lower transfer resistance than Comparative Examples 1 and 2. Accordingly, the positive active material of Example 1 had higher electrical conductivity than that of Comparative Examples 1 and 2.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims.

In the present disclosure, the terms "Example," "Comparative Example" and "Evaluation Example" are used to identify a particular example or experimentation and should not be interpreted as admission of prior art.

What is claimed is:

1. A positive active material for a rechargeable lithium battery, comprising:
   a core including a lithium nickel-based oxide, a lithium iron phosphate-based compound, or a combination thereof; and
   a carbon nanotube grown on the surface of the core, wherein the grown carbon nanotube is included in an amount of about 0.1 parts by weight to about 3 parts by weight based on 100 parts by weight of the core, the grown carbon nanotube has a length of about 1 μm to about 10 μm, the grown carbon nanotube has a thickness of about 20 nm to about 50 nm, and the core has an average particle diameter of about 1 μm to about 25 μm.

2. The positive active material for a rechargeable lithium battery of claim 1, wherein the positive active material has a shape where the grown carbon nanotube surrounds the core.

3. A rechargeable lithium battery, comprising a positive electrode including the positive active material for rechargeable lithium battery according claim 1;
a negative electrode; and
an electrolyte.

4. The rechargeable lithium battery of claim 3, wherein the positive active material has a shape where the grown carbon nanotube surrounds the core.

* * * * *